United States Patent [19]

Kadowaki et al.

[11] Patent Number: 5,293,367
[45] Date of Patent: Mar. 8, 1994

[54] OPTICAL PICKUP HEAD WHEREIN AN ERROR SIGNAL IS PRODUCED BY DETECTING A PHASE DIFFERENCE IN DIFFRACTION BEAMS FROM A HOLOGRAPHIC OPTICAL ELEMENT

[75] Inventors: Shinichi Kadowaki; Yoshiaki Komma; Naoyasu Miyagawa, all of Osaka, Japan

[73] Assignee: Matsushita Electric Industrial Co., Ltd., Osaka, Japan

[21] Appl. No.: 669,548

[22] Filed: Mar. 14, 1991

[30] Foreign Application Priority Data

Jun. 6, 1990 [JP] Japan .................. 2-147805

[51] Int. Cl.⁵ ............................... G11B 7/13
[52] U.S. Cl. ...................... 369/44.37; 369/44.12; 369/44.41; 369/103
[58] Field of Search ............ 369/44.41, 44.12, 44.11, 369/44.37, 112, 103, 116, 44.38, 44.42, 44.25, 44.23, 44.32, 44.28, 109, 110, 124

[56] References Cited

U.S. PATENT DOCUMENTS

| | | |
|---|---|---|
| 4,358,200 | 11/1982 | Heemskerk et al. |
| 4,665,310 | 5/1987 | Heemskerk . |
| 4,731,772 | 3/1988 | Lee . |
| 4,929,823 | 5/1990 | Kato et al. |

FOREIGN PATENT DOCUMENTS

| | | | |
|---|---|---|---|
| 228620 | 7/1987 | European Pat. Off. | |
| 311340 | 4/1989 | European Pat. Off. | |
| 354019 | 2/1990 | European Pat. Off. | |
| 357323 | 3/1990 | European Pat. Off. | |
| 318912 | 6/9189 | European Pat. Off. | |
| 63-225930(A) | 9/1988 | Japan | 369/44.12 |
| 64-55745 | 3/1989 | Japan . | |

OTHER PUBLICATIONS

"Patent Absracts Of Japan" vol. 13, No. 82 (P-833) Feb. 23, 1989, & JP-A-63 263636 (Matsushita Electric Ind Co Ltd) Oct. 31, 1988, * the whole document *.
"Applied Optics" vol. 27, No. 4, Feb. 1983, New York, NY, USA pp. 668-671; Yasuo Kimura et al: Compact optical head using a holographic optical element for CD players * p. 669, col. 1, lines 3-19; FIG. 1 *.

*Primary Examiner*—Aristotelis Psitos
*Assistant Examiner*—Muhammad N. Edun
*Attorney, Agent, or Firm*—Lowe, Price, LeBlanc & Becker

[57] ABSTRACT

A light source emits a light beam which is focused on an optical recording medium. The light beam is reflected and diffracted by the optical recording medium. A holographic optical element has divided regions formed with different holographic patterns. The divided regions of the holographic optical element diffract the light beam reflected and diffracted by the optical recording medium, and thereby generate diffraction light beams respectively. The divided regions of the holographic optical element lie in quadrants of an imaginary X-Y coordinate system respectively. An X axis of the coordinate system extends in a direction corresponding to a direction of a pit sequence on the optical recording medium, that is, a tangential direction of the optical recording medium. A Y axis of the coordinate system extends in a direction corresponding to a direction perpendicular to the direction of the pit sequence, that is, a radial direction of the optical recording medium. Photodetectors receive the diffraction light beams generated by the divided regions of the holographic optical element, and convert the received diffraction light beams into corresponding electric signals. Phases of the electric signals are compared, and a tracking error signal is generated on the basis of a result of the phase comparison.

4 Claims, 8 Drawing Sheets

5,293,367

OPTICAL PICKUP HEAD WHEREIN AN ERROR SIGNAL IS PRODUCED BY DETECTING A PHASE DIFFERENCE IN DIFFRACTION BEAMS FROM A HOLOGRAPHIC OPTICAL ELEMENT

BACKGROUND OF THE INVENTION

This invention relates to an optical pickup head for optically reproducing information from an optical recording medium such as an optical disk or an optical card.

An optical recording medium such as an optical disk is formed with a pattern of a groove or pits which represents recorded information. Some optical pickup heads are used in reproducing information from such an optical recording medium. In general, the optical pickup head applies laser light to the optical recording medium and detects the laser light reflected back from the optical recording medium. Since the reflected laser light depends on a pattern on the optical recording medium, the reflected laser light represents information on the optical recording medium. Thus, the detection of the reflected laser light enables the reproduction of the information.

Japanese published unexamined patent application 64-55745, U.S. Pat. Nos. 4,358,200, 4,665,310, 4,731,772, and 4,929,823 disclose advanced optical pickup heads which have a holographic optical element disposed in an optical path among a light source, an optical recording medium, and a photodetector unit. The holographic optical element is designed so that focusing and tracking error signals will be obtained by detecting diffraction light beams outputted from the holographic optical element. The use of the holographic optical element enables a compact and small design of the optical pickup head.

As will be explained later, the optical pickup head disclosed in Japanese published unexamined patent application 64-55745 has some problem.

SUMMARY OF THE INVENTION

It is an object of this invention to provide an improved optical pickup head.

A first aspect of this invention provides an optical pickup head operating on an optical recording medium having a pit sequence, wherein a direction of the pit sequence is defined as a tangential direction of the optical recording medium and a direction perpendicular to the direction of the pit sequence is defined as a radial direction of the optical recording medium, the optical pickup head comprising a light source emitting a light beam; means for focusing the light beam emitted from the light source on the optical recording medium, wherein the light beam is reflected and diffracted by the optical recording medium; a holographic optical element having divided regions formed with different holographic patterns, wherein the divided regions diffract the light beam reflected and diffracted by the optical recording medium, and generate diffraction light beams from the light beam reflected and diffracted by the optical recording medium respectively, wherein the divided regions lie in quadrants of an imaginary X-Y coordinate system respectively, and an X axis of the coordinate system extends in a direction corresponding to the tangential direction of the optical recording medium and a Y axis of the coordinate system extends in a direction corresponding to the radial direction of the optical recording medium; photodetectors receiving the diffraction light beams generated by the divided regions of the holographic optical element, and converting the received diffraction light beams into corresponding electric signals; and means for comparing phases of the electric signals and generating a tracking error signal on the basis of a result of said phase comparing.

A second aspect of this invention provides an optical pickup head operating on an optical recording medium having a track, comprising a light source emitting a light beam; means for focusing the light beam emitted from the light source on the optical recording medium, wherein the light beam is reflected and diffracted by the optical recording medium; a holographic optical element having divided regions formed with different holographic patterns, wherein the divided regions diffract the light beam reflected and diffracted by the optical recording medium, and generate diffraction light beams from the light beam reflected and diffracted by the optical recording medium respectively, wherein the divided regions are in a configuration predetermined with respect to a direction of the track of the optical recording medium; photodetectors receiving the diffraction light beams generated by the divided regions of the holographic optical element, and converting the received diffraction light beams into corresponding electric signals; and means for comparing phases of the electric signals and generating a tracking error signal on the basis of a result of said phase comparing.

DESCRIPTION OF THE PRIOR ART

Figure 1:
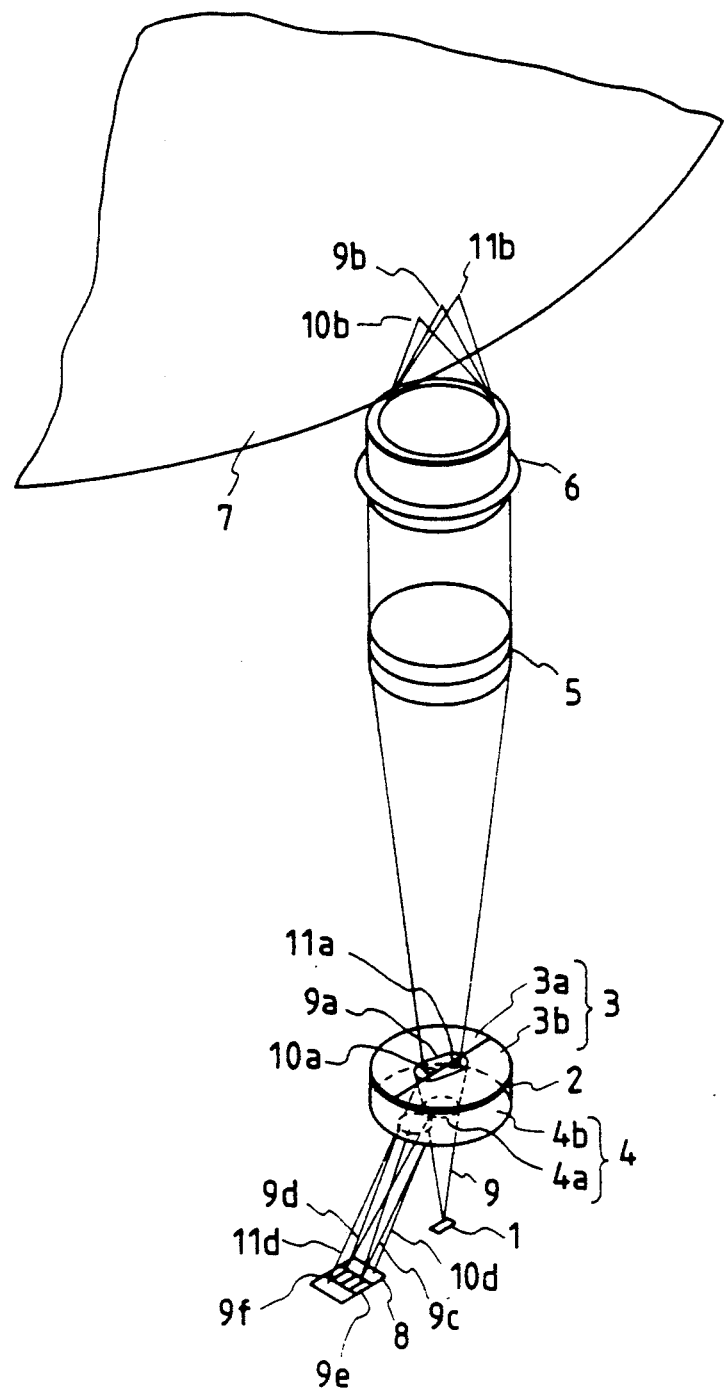
FIG. 1 is a diagrammatic perspective view of a prior art optical pickup head.

FIG. 1 shows a prior art optical pickup head disclosed in Japanese published unexamined patent application 64-55745.

With reference to FIG. 1, the prior art optical pickup head includes a semiconductor laser light source 1 emitting a laser light beam 9 incident to a diffraction grating section 4a of a diffraction grating surface 4 of a diffraction element (a holographic optical element) 2. The incident light beam 9 is separated by the diffraction element 2 into a 0-order diffraction light beam 9a and a pair of first-order diffraction light beams 10a and 11a. The 0-order diffraction light beam 9a is used for detecting a pit signal (a recorded information signal) from an optical disk 7 and also detecting a focusing error on the optical disk 7. The pair of the first-order diffraction light beams 10a and 11a are used for detecting a tracking error on the optical disk 7. The diffraction light beams 9a, 10a, and 11a encounter a holographic grating surface 3 of the diffraction element 2, and 0-order diffraction light beams result in correspondence with the light beams 9a, 10a, and 11a respectively. The 0-order diffraction light beams outputted from the holographic grating surface 3 of the diffraction element 2 pass through a collimator lens 5 and an objective lens 6, being focused into light spots 9b, 10b, and 11b on an information recording surface of the optical disk 7. The light spots 9b, 10b, and 11b originate from the light beams 9a, 10a, and 11a respectively. The light spots 10b and 11b are located at opposite sides of the light spot 9b and are separated in a tangential direction of the optical disk 7.

The light beams are reflected back by the information recording surface of the optical disk 7, passing through the objective lens 6 and the collimator lens 5 and returning to the holographic grating surface 3 of the diffraction element 2. The holographic grating surface 3 has divided holographic grating sections 3a and 3b, generating 0-order diffraction light beams, a pair of first-order diffraction light beams 9c, 10c, and 11c, and a pair of first-order diffraction light beams 9d, 10d, and 11d from the incident light beams. The 0-order diffraction light beams return to the laser light source 1. The first-order diffraction light beams 9c, 10c, 11c, 9d, 10d, and 11d pass through a non-grating portion 4b of the diffraction element 2, being incident to a 6-segment photodetector unit 8 and forming light spots 9e, 10e, 11e, 9f, 10f, and 11f on the photodetector unit 8 respectively.

Figure 2:
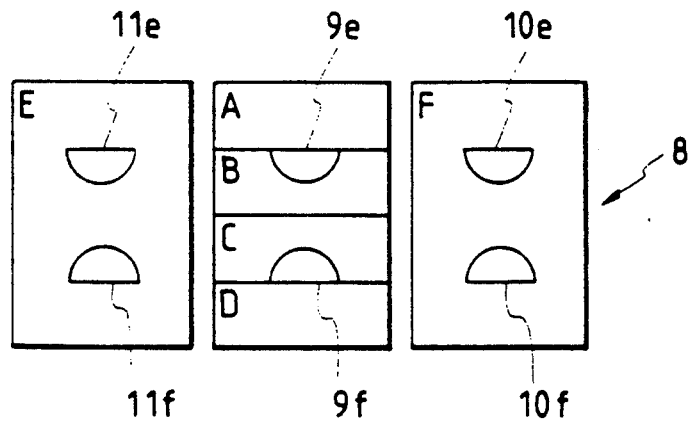
FIGS. 2–4 are diagrammatic plan views of the photodetector unit of FIG. 1.
Figure 3:
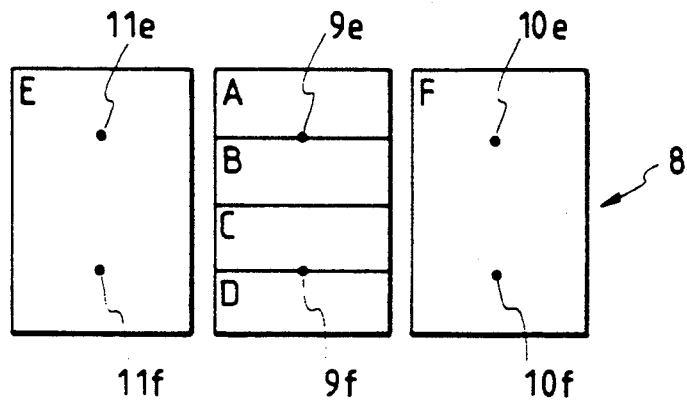
Figure 4:
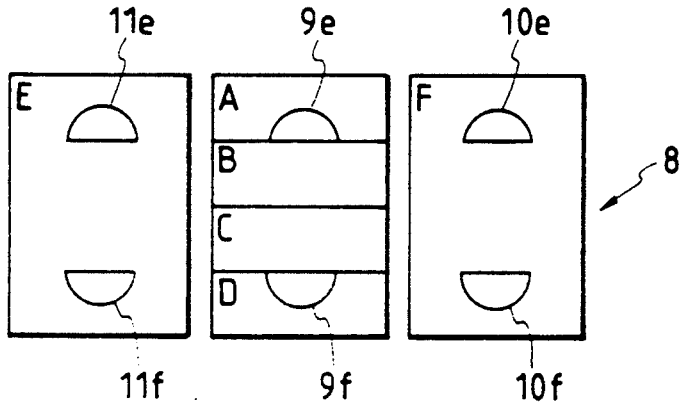

As shown in FIGS. 2–4, the photodetector unit 8 has divided segments A, B, C, D, E, and F. When the light beam 9a is accurately focused on the optical disk 7, the light spots 9e, 10e, 11e, 9f, 10f, and 11f on the photodetector unit 8 take shapes as shown in FIG. 3. When the light beam 9a is defocused on the optical disk 7 in a first direction, the light spots 9e, 10e, 11e, 9f, 10f, and 11f on the photodetector unit 8 take shapes as shown in FIG. 2. When the light beam 9a is defocused on the optical disk 7 in a second direction, the light spots 9e, 10e, 11e, 9f, 10f, and 11f on the photodetector unit 8 take shapes as shown in FIG. 4.

A radio-frequency information signal (the pit signal) RF, a focusing error signal FE, and a tracking error signal TE are generated on the basis of the output signals from the segments A-F of the photodetector unit 8. The generation of the focusing error signal FE uses a double knife edge method. The generation of the tracking error signal TE uses a 3-beam method. Specifically, the focusing error signal FE, the tracking error signal TE, and radio-frequency information signal RF are generated by executing the following calculations.

$$FE = (A + D) - (B + C)$$

$$TE = E - F$$

$$RF = A + B + C + D$$

where the characters A, B, C, D, E, and F denote the output signals from the photodetector segments A, B, C, D, E, and F respectively.

The prior art optical pickup head of FIGS. 1–4 has the following problems. In order to prevent the diffraction light beams 9c, 10c, 11c, 9d, 10d, and 11d from being re-diffracted by the diffraction grating surface 4 of the holographic optical element 2, it is necessary that the thickness of the holographic optical element 2 is large while the area of the diffraction grating section 4a of the diffraction grating surface 4 is small. The thick holographic optical element 2 causes the whole optical pickup head to be heavy. The small diffraction grating section 4a requires a high accuracy of the alignment of the holographic optical element 2 during the assembly of the optical pickup head.

DESCRIPTION OF THE FIRST PREFERRED EMBODIMENT

Figure 5:
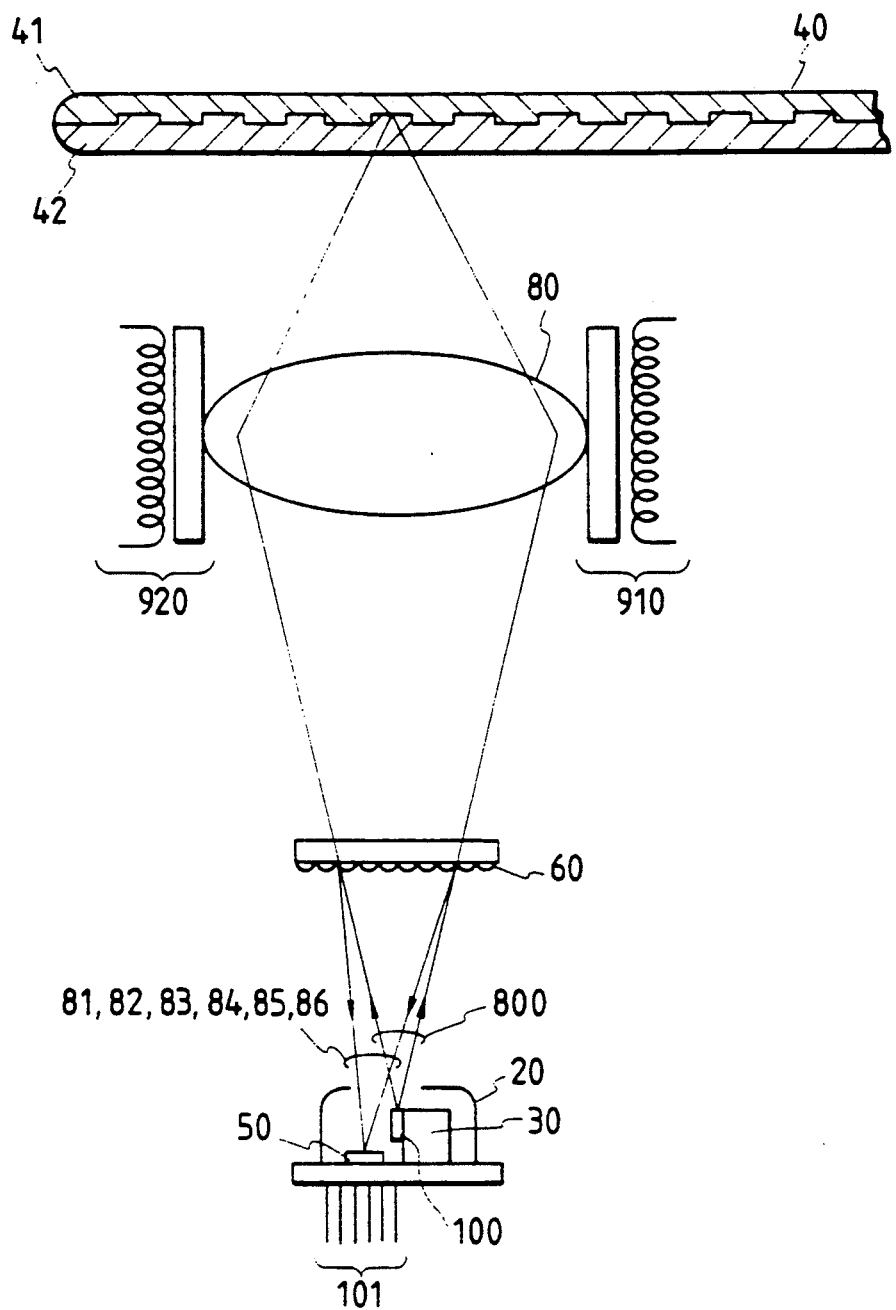
FIG. 5 is a sectional view of an optical pickup head according to a first embodiment of this invention.

With reference to FIG. 5, an optical pickup head includes a semiconductor laser light source 100 for emitting a coherent laser light beam 800 having a wavelength of, for example, about 780 nm. The light source 100, a photodetector unit 50, and a block 30 are housed in a package 20. The block 30 is connected to the light source 100 to enable heat to escape from the light source 100. The light source 100, the photodetector unit 50, and the package 20 compose a hybrid device. The hybrid device is provided with a connection terminal 101 via which the light source 100 and the photodetector unit 50 can be electrically connected to an external circuit (not shown). The connection terminal 101 extends through a bottom wall of the package 20 and the photodetector unit 50 is placed at a bottom of the interior of the package 20 so that bonding wires between the photodetector unit 50 and the connection terminal 101 can be short.

The laser light beam 800 emitted from the light source 100 passes through a transmission holographic optical element 60, being incident to a condenser lens or an objective lens 80 and being focused by the lens 80 on an optical recording medium 40. The optical recording medium 40 includes a substrate or a base plate 41 coated with a protective film 42. The substrate 41 is formed with a pattern of a groove or pits (a track) which represents recorded information. The light beam is reflected and diffracted back from the optical recording medium 40, passing through the lens 80 and returning to the holographic optical element 60. The light beam passes through the holographic optical element 60 and then reaches the photodetector unit 50. The lens 80 can be moved by a focusing control actuator 910 and a tracking control actuator 920.

A 0-order diffraction light beam generated by the holographic optical element 60 on the basis of the laser light beam 800 from the light source 100 is focused by the lens 80 on the optical recording medium 40. The laser light beam returned to the holographic optical element 60 from the optical recording medium 40 is separated into a 0-order diffraction light beam and other diffraction light beams 81, 82, 83, 84, 85, and 86. The 0-order diffraction light beam moves back to the light source 100. The diffraction light beams 81-86 are incident to the photodetector unit 50. The diffraction light beams 81 and 82 are used for generating a focusing error signal. The diffraction light beams 83-86 are used for generating a tracking error signal.

Figure 6:
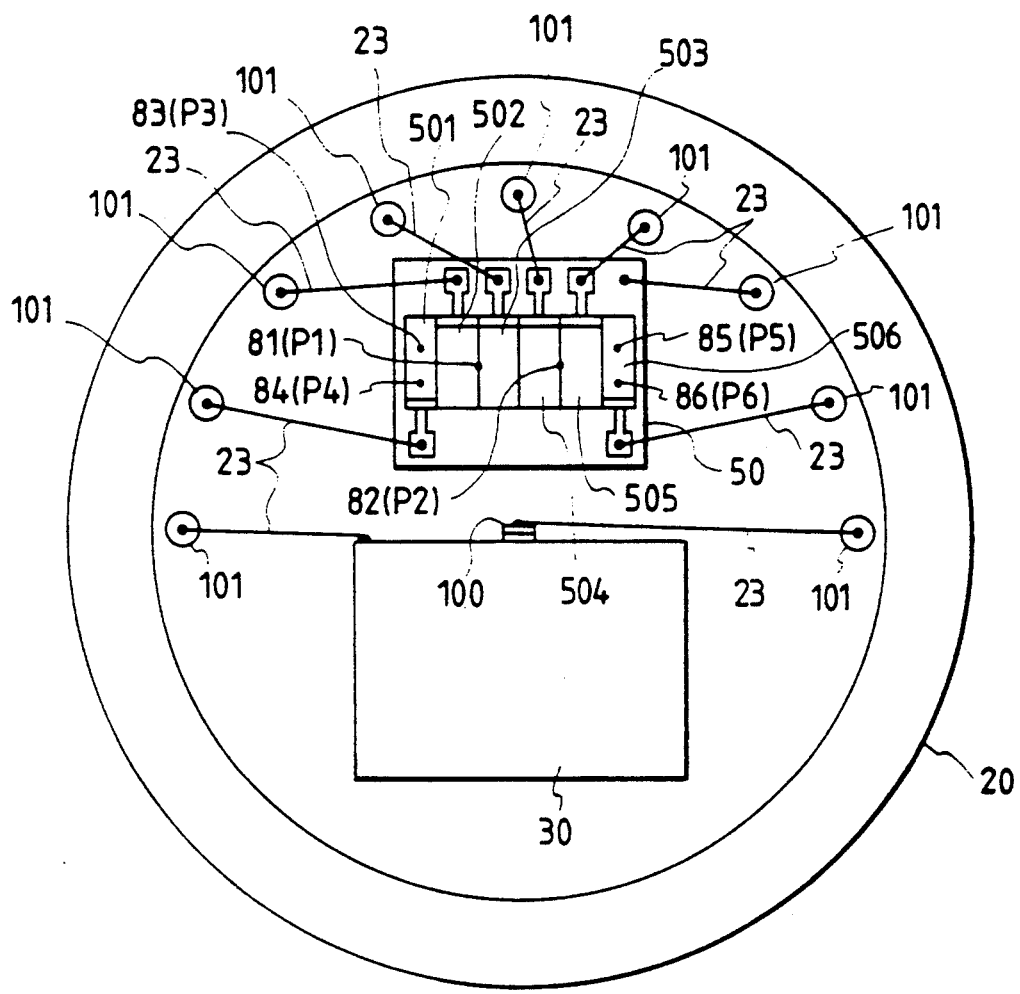
FIG. 6 is a plan view of the hybrid device in the optical pickup head of FIG. 5.

As shown in FIG. 6, the hybrid device includes the light source 100 and the photodetector unit 50 which are housed in the package 20. Bonding wires 23 extend between the photodetector unit 50 and segments of the connection terminal 101 and between the light source 100 and segments of the connection terminal 101. The photodetector unit 50 has an alignment of 6-segment photodetectors 501, 502, 503, 504, 505, and 506. The holographic optical element 60 and the alignment of the photodetectors 501-506 are designed so as to realize the following conditions. When the light beam 800 emitted from the light source 100 is accurately focused on the optical recording medium 40, the focusing-error-detecting light beam 81 coming from the holographic optical element 60 is focused into a point P1 on the boundary between the photodetectors 502 and 503, and the focusing-error-detecting light beam 82 coming from the holographic optical element 60 is focused into a point P2 on the boundary between the photodetectors 504 and 505. In addition, the tracking-error-detecting light beams 83, 84, 85, and 86 coming from the holographic optical element 60 are focused into points P3, P4, P5, and P6 within the surfaces of the photodetectors 501 and 506. The grating pattern on the holographic optical element 60 is formed by recording interference fringes on a predetermined region of the original member for the holographic optical element 60, the interference fringes resulting from the interference between the reference light beam emitted from a reference light source placed at the light emitting point of the light source 100 and the object light beams emitted from object light sources placed at the focal points P1-P6. The holographic optical element 60 is formed in a known method such as a two-beam interferometry process or a computer generated hologram method.

Figure 7:
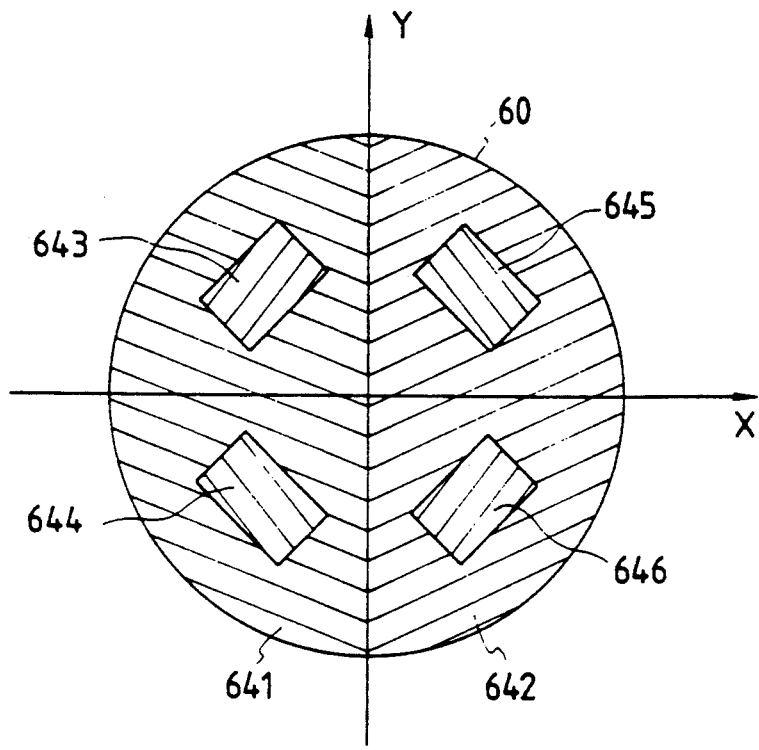
FIG. 7 is a plan view of the holographic optical element of FIG. 5.

As shown in FIG. 7, the holographic optical element 60 has a circular operative surface separated into semicircular holographic grating regions 641 and 642. Rectangular holographic grating regions 643 and 644 extend in the semicircular holographic grating region 641. Rectangular holographic grating regions 645 and 646 extend in the semicircular holographic grating region 642. The rectangular holographic grating regions 643-646 are arranged around the center of the circular operative surface of the holographic optical element 60 at equal angular intervals. The semicircular holographic grating regions 641 and 642 are designed so as to cause two focusing-error-detecting diffraction light beams traveling along different directions respectively. Specifically, the semicircular holographic grating region 641 is formed with a pattern of lines, and the semicircular holographic grating region 642 is formed with a pattern of lines which inclines with respect to the pattern in the semicircular holographic grating region 641. The rectangular holographic grating regions 643-646 are designed so as to cause tracking-error-detecting diffraction light beams. Specifically, the rectangular holographic grating regions 643-646 are formed with patterns of parallel lines extending in different directions respectively. In addition, the directions of the lines of the rectangular holographic grating regions 643-646 differ from the directions of the lines of the semicircular holographic grating regions 641 and 642. In FIG. 7, the characters X and Y denote axes of an assumed two-dimensional orthogonal coordinate system whose origin coincides with the center of the circular operative surface of the holographic optical element 60. The X extends in a direction corresponding to the tangential direction of the optical recording medium 40, that is, the direction of a pit sequence (a track) on the recording medium 40. The Y axis extends in a direction corresponding to the radial direction of the optical recording medium, that is, the direction perpendicular to the pit sequence. The rectangular holographic grating regions 643-646 for tracking error detection lie in the quadrants of the X-Y coordinate system respectively.

Figure 8:
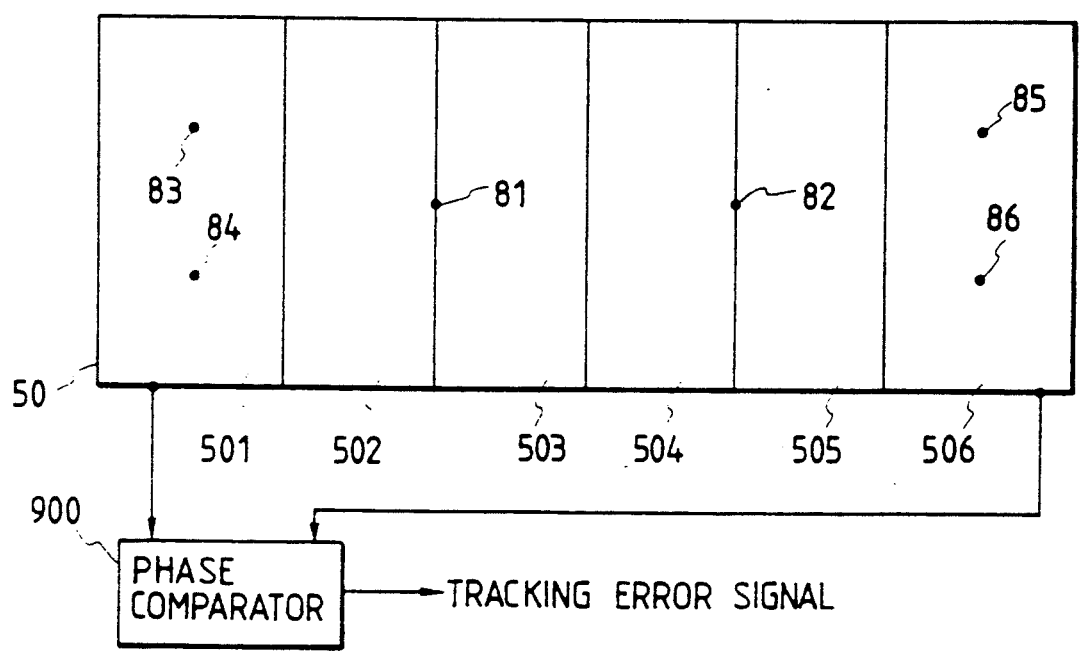
FIG. 8 is a diagrammatic plan view of the photodetector unit of FIG. 5.

The semicircular holographic grating region 642 generates the diffraction light beam 81, which is incident to the boundary between the photodetectors 502 and 503 as shown in FIG. 8. The semicircular holographic grating region 641 generates the diffraction light beam 82, which is incident to the boundary between the photodetectors 504 and 505 as shown in FIG. 8. The rectangular holographic grating region 643 generates the diffraction light beam 83, which is incident to the photodetector 501 as shown in FIG. 8. The rectangular holographic grating region 646 generates the diffraction light beam 84, which is incident to the photodetector 501 as shown in FIG. 8. The rectangular holographic grating region 645 generates the diffraction light beam 85, which is incident to the photodetector 506 as shown in FIG. 8. The rectangular holographic grating region 644 generates the diffraction light beam 86, which is incident to the photodetector 506 as shown in FIG. 8.

Figure 9:
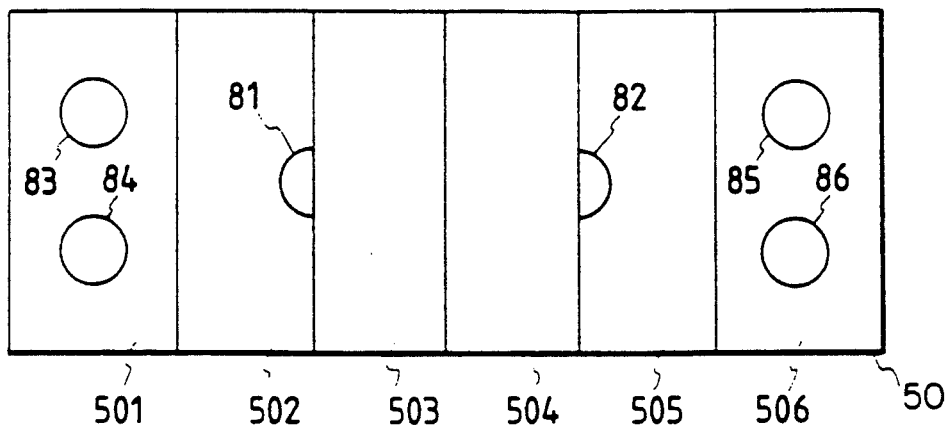
FIGS. 9–11 are diagrammatic plan views of the photodetector unit of FIG. 5.
Figure 10:
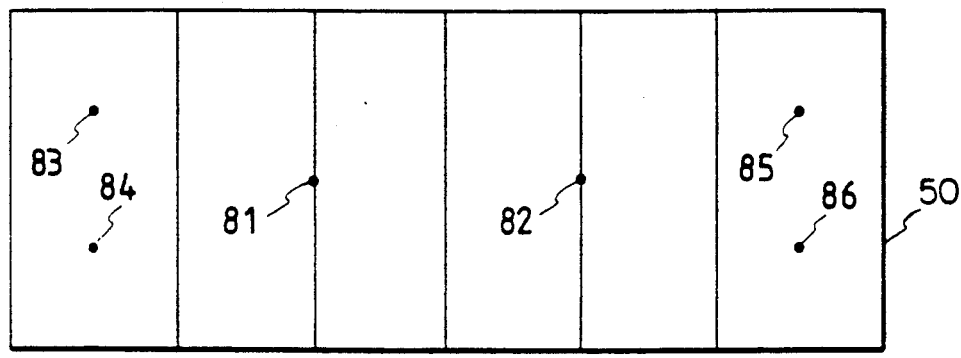
Figure 11:
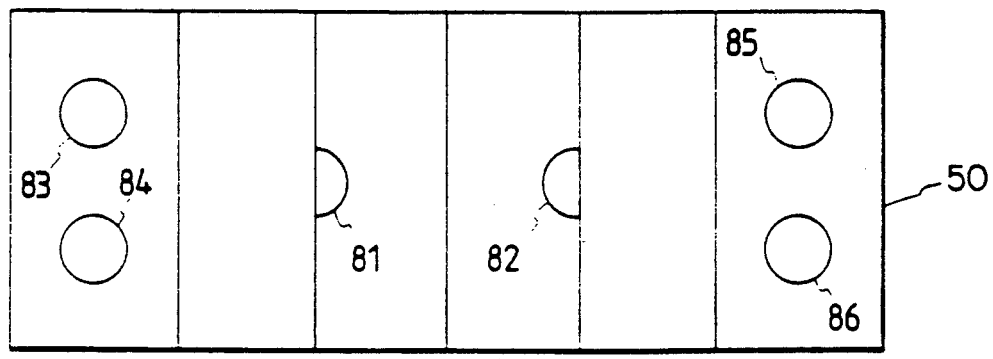

FIGS. 9, 10, and 11 show the relation between the photodetectors 501-506 and the diffraction light beams 81-86 under different conditions of the focusing of the light beam 800 on the optical recording medium 40. When the light beam 800 is accurately focused on the optical recording medium 40, the diffraction light beams 81-86 form small spots on the photodetectors 501-506 as shown in FIG. 10. When the light beam 800 is defocused in a first direction, the diffraction light beams 81-86 form large circles and semicircles on the photodetectors 501-506 as shown in FIG. 9. When the light beam 800 is defocused in a second direction, the diffraction light beams 81-86 form large circles and semicircles on the photodetectors 501-506 as shown in FIG. 11.

A radio-frequency information signal (a radio-frequency pit signal), a focusing error signal, and a tracking error signal are generated on the basis of the output signals from the photodetectors 501-506. Specifically, the focusing error signal is generated by subtracting the sum of the output signals from the photodetectors 502 and 505 from the sum of the output signals from the photodetectors 503 and 504. The tracking error signal is generated by comparing the phases of the output signals from the photodetectors 501 and 506 according to a known phase difference method. Phase comparison is a well-known technique which can be accomplished in a variety of methods and devices. Whatever device is used for phase comparison, it is necessary to compare the phase relationship at a given instant between two-time varying quantities. The phase of one is usually assumed to be zero and the phase of the other is described with respect to the first, as the fractional part of it through which the second quantity must vary to achieve zero on its own. In this case, the fractional part of the period is used to express in terms of angular measure with one period being greater than 360° or $2\pi$ radians. Thus, two sine waves of a given frequency are said to be 90° or $2\pi$, out-of-phase when a second must be displaced in time, with respect to the first, by one-fourth period in order for it to achieve a zero value. (The McGraw-Hill Encyclopedia of Science and Technology, 6th Edition, 1987, p. 664.) Because of the signal manipulations necessary to provide a complete phase comparison, as opposed to the simple differentiation of absolute value signals, the technique of phase comparison is most readily carried out by microprocessors.

However, in the past, it is well known for this technique to be carried out by less sophisticated circuit devices. Specifically, as shown in FIG. 8, the output signals from the photodetectors 501 and 506 are fed to a phase comparator 900, being compared in phase with each other by the phase comparator 900. The phase comparator 900 outputs a signal representing a result of the phase comparison. The output signal from the phase comparator 900 is used as the tracking error signal. The radio-frequency information signal is generated by summing the output signals from the photodetectors 501-506.

This embodiment features that the light beam reflected and diffracted back from the optical recording medium 40 is separated by the holographic grating regions 643-646 of the holographic optical element 60 into the diffraction light beams 83-86 and that the tracking error signal is generated on the basis of the detection of the diffraction light beams 83-86 by the photodetectors 501 and 506 according to the phase difference method. In connection with this feature, this invention has the following advantages. Since it is sufficient that only one surface of the holographic optical element 60 is formed with the holographic gratings, the thickness of the holographic optical element 60 can be equal to a small value, for example, a value of about 0.1 to 1 mm. Thin holographic optical element 60 enables the whole of the optical pickup head to be compact and light. Since the tracking error signal is generated by the phase comparison, the tracking error signal is affected by positional errors of the photographic grating regions 643-646 to only a small degree. This can eliminate a very strict alignment between the optical parts, so that the efficiency of the production of the optical pickup head can be increased.

DESCRIPTION OF THE SECOND PREFERRED EMBODIMENT

Figure 12:
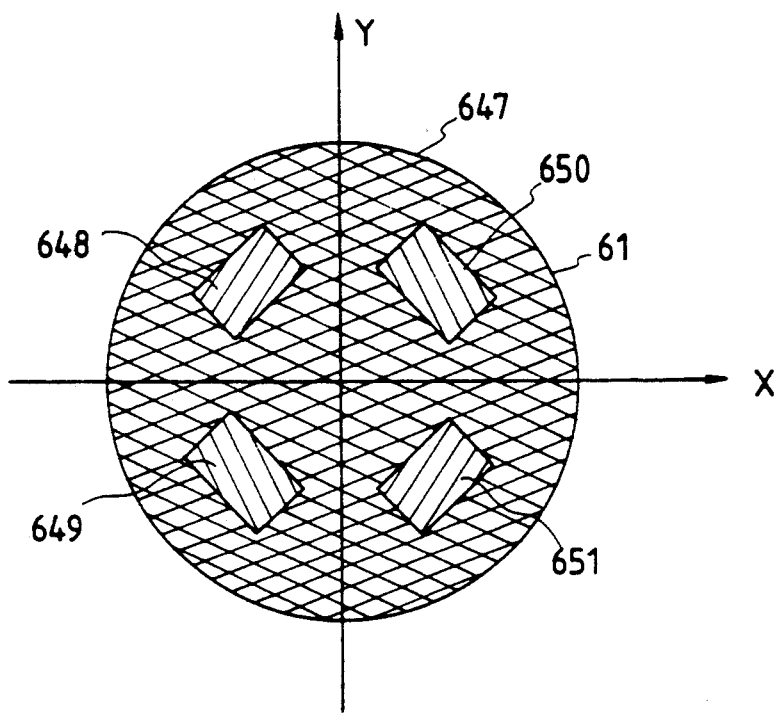
FIG. 12 is a plan view of a holographic optical element in an optical pickup head according to a second embodiment of this invention.
Figure 13:
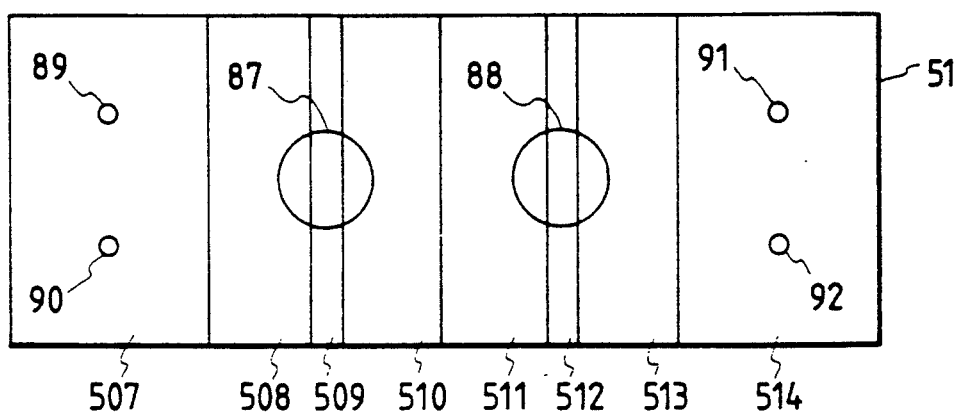
FIG. 13 is a diagrammatic plan view of a photodetector unit in the optical pickup head according to the second embodiment of this invention.

FIGS. 12 and 13 show portions of a second embodiment of this invention which is similar to the embodiment of FIGS. 5-11 except for design changes indicated hereinafter.

In the second embodiment, the holographic optical element 60 (see FIGS. 5 and 7) is replaced by a holographic optical element 61. As shown in FIG. 12, the holographic optical element 61. As shown in FIG. 12, the holographic optical element 61 has a circular operative surface separated into divided holographic grating regions 647, 648, 649, 650, and 651. The holographic grating region 647 approximately agrees in shape with the circular operative surface of the holographic optical element 61. The circular holographic grating region 647 is formed with a rhombic lattice pattern of a first group of parallel lines and a second group of parallel lines inclined to the lines of the first group. The circular holographic grating region 647 causes two diffraction light beams of different wavefronts for the focusing error detection. The holographic grating regions 648-651 are rectangular, and are arranged around the center of the circular operative surface of the holographic optical element 61 at equal angular intervals. The rectangular holographic grating regions 648-651 are designed so as to cause tracking-error-detecting diffraction light beams. Specifically, the rectangular holographic grating regions 648-651 are formed with patterns of parallel lines extending in different directions respectively. In addition, the directions of the lines of the rectangular holographic grating regions 648-651 differ from the directions of the lines of the circular holographic grating region 647. The rectangular holographic grating regions 648-651 are similar to the rectangular holographic grating regions 643-646 of FIG. 7.

In the second embodiment, the photodetector unit 50 (see FIGS. 6 and 8) is replaced by a photodetector unit 51. As shown in FIG. 13, the photodetector unit 51 has an alignment of 8-segment photodetectors 507, 508, 509, 510, 511, 512, 513, and 514. The circular holographic grating region 647 generates a diffraction light beam 87, which is incident to the photodetectors 508-510 as shown in FIG. 13. In addition, the circular holographic grating region 647 generates a diffraction light beam 88, which is incident to the photodetectors 511-513 as shown in FIG. 13. The rectangular holographic grating region 648 generates a diffraction light beam 89, which is incident to the photodetector 507 as shown in FIG. 13. The rectangular holographic grating region 651 generates a diffraction light beam 90, which is incident to the photodetector 507 as shown in FIG. 13. The rectangular holographic grating region 650 generates a diffraction light beam 91, which is incident to the photodetector 514 as shown in FIG. 13. The rectangular holographic grating region 649 generates the diffraction light beam 92, which is incident to the photodetector 514 as shown in FIG. 13.

A radio-frequency information signal (a radio-frequency pit signal), a focusing error signal, and a tracking error signal are generated on the basis of the output signals from the photodetectors 507-514. Specifically, the focusing error signal is generated from the difference between the photodetectors 509 and 512. The generation of the focusing error signal uses a known spot size detection method. The focusing error signal may be generated by the difference between the sum of the output signals from the photodetectors 509, 511, and 513, and the sum of the output signals from the photodetectors 508, 510, and 512. The tracking error signal is generated by comparing the phases of the output signals from the photodetectors 507 and 514 according to a known phase difference method. The radio-frequency information signal is generated by summing the output signals from the photodetectors 507-514.

The holographic pattern on the circular region 647 of the holographic optical element 61 is designed so as to satisfy the following conditions. When a light beam is accurately focused on an optical recording medium, the diffraction light beams 87 and 88 coming from the holographic optical element 61 form equal-size spots on the photodetector unit 51, and the focal points with respect to the diffraction light beams 87 and 88 lie frontward and rearward of the light-receiving surface of the photodetector unit 51 respectively.

DESCRIPTION OF THE THIRD PREFERRED EMBODIMENT

Figure 14:
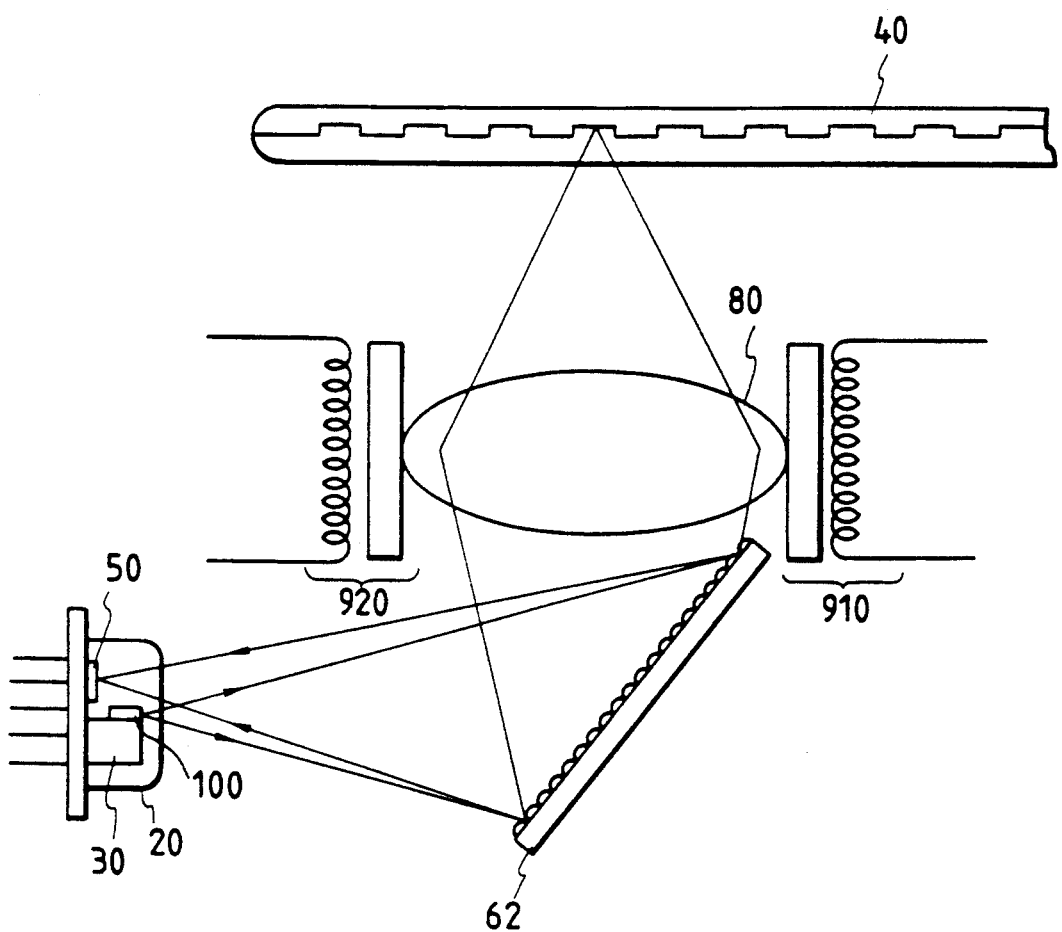
FIG. 14 is a sectional view of an optical pickup head according to a third embodiment of this invention.

FIG. 14 shows a third embodiment of this invention which is similar to the embodiment of 5-11 except that the transmission holographic optical element 60 (see FIG. 5) is replaced by a reflection holographic optical element 62.

What is claimed is:

1. An optical pickup head operating on an optical recording medium having a pit sequence, wherein a direction of the pit sequence is defined as a tangential direction of the optical recording medium and a direction perpendicular to the direction of the pit sequence is defined as a radial direction of the optical recording medium, the optical pickup head comprising:

a light source emitting a light beam;

means for focusing the light beam emitted from the light source on the optical recording medium, wherein the light beam is reflected and diffracted by the optical recording medium;

a holographic optical element having divided regions formed with different holographic patterns, wherein the divided regions diffract the light beam reflected and diffracted by the optical recording medium, and generate diffraction light beams from the light beam reflected and diffracted by the optical recording medium respectively, wherein the divided regions lie in quadrants of an imaginary X-Y coordinate system respectively, and an X axis of the coordinate system extends in a direction corresponding to the tangential direction of the optical recording medium and a Y axis of the coordinate system extends in a direction corresponding to the radial direction of the optical recording medium;

photodetectors receiving the diffraction light beams generated by the divided regions of the holographic optical element, and converting the received diffraction light beams into corresponding electric signals; and means for comparing phases of the electric signals and generating a tracking error signal on the basis of a result of said phase comparing.

2. An optical pickup head operating on an optical recording medium having a track, comprising:

a light source emitting a light beam;

means for focusing the light beam emitted from the light source on the optical recording medium, wherein the light beam is reflected and diffracted by the optical recording medium;

a holographic optical element having divided regions formed with different holographic patterns, wherein the divided regions diffract the light beam reflected and diffracted by the optical recording medium, and generate diffraction light beams from the light beam reflected and diffracted by the optical recording medium respectively, wherein the divided regions are in a configuration predetermined with respect to a direction of the track of the optical recording medium;

photodetectors receiving the diffraction light beams generated by the divided regions of the holographic optical element, and converting the received diffraction light beams into corresponding electric signals; and means for comparing phases of the electric signals and generating a tracking error signal on the basis of a result of said phase comparing.

3. An optical pickup head operating on an optical recording medium having a pit sequence, wherein a direction of the pit sequence is defined as a tangential direction of the optical recording medium and a direction perpendicular to the direction of the pit sequence is defined as a radial direction of the optical recording medium, the optical pickup head comprising:

a light source emitting a light beam;

means for focusing the light beam emitted from the light source on the optical recording medium, wherein the light beam is reflected and diffracted by the optical recording medium;

a holographic optical element being divided into four quadrants with a holographic pattern for generating information of a focus error, each quadrant having the same holographic pattern and containing a discrete region having a different holographic pattern different than the quadrant containing the discrete region for generating information of a tracking error, wherein the holographic optical element diffracts the light beam reflected and diffracted by the optical recording medium, and generates diffraction light beams from the light beam reflected and diffracted by the optical recording medium respectively, wherein the quadrants are aligned in an imaginary X-Y coordinate system, an X axis of the coordinate system extending in a direction corresponding to the tangential direction of the optical recording medium and a Y axis of the coordinate system extending in a direction corresponding to the radial direction of the optical recording medium;

photodetectors receiving the diffraction light beams generated by the discrete regions of the holographic optical element, and converting the received diffraction light beams into corresponding electric signals; and means for comparing phases of the electric signals and generating a tracking error signal on the basis of a result of said phase comparing.

4. An optical pickup head operating on an optical recording medium having a track, comprising:

a light source emitting a light beam;

means for focusing the light beam emitted from the light source on the optical recording medium, wherein the light beam is reflected and diffracted by the optical recording medium;

a holographic optical element being divided into four quadrants with different patterns for generating information of a focus error, each quadrant having a first holographic pattern and containing a discrete region having a holographic pattern different than said first holographic pattern for each quadrant for generating information of a tracking error, wherein the holographic optical element diffracts the light beam reflected and diffracted by the optical recording medium, and generates diffraction light beams from the light beam reflected and diffracted by the optical recording medium respectively, the discrete regions are in a configuration predetermined with respect to a direction of the track of the optical recording medium, and the first holographic pattern is not the same for each said quadrant;

photodetectors receiving the diffraction light beams generated by the discrete regions of the holographic optical element, and converting the received diffraction light beams into corresponding electric signals; and means for comparing phases of the electric signals and generating a tracking error signal on the basis of a result of said phase comparing.

* * * * *